(12) United States Patent
Westra et al.

(10) Patent No.: US 9,639,688 B2
(45) Date of Patent: May 2, 2017

(54) METHODS AND SYSTEMS FOR IMPLEMENTING AND ENFORCING SECURITY AND RESOURCE POLICIES FOR A VEHICLE

(75) Inventors: Michael Raymond Westra, Plymouth, MI (US); Sandeep Singh Waraich, Tecumseh (CA); Sukhwinder Wadhwa, Windsor (CA); Michael J. Schanerberger, Northville, MI (US); Jason Bernard Johnson, Dearborn, MI (US); Julius Marchwicki, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1051 days.

(21) Appl. No.: 12/788,797

(22) Filed: May 27, 2010

(65) Prior Publication Data

US 2011/0295444 A1    Dec. 1, 2011

(51) Int. Cl.
*G06F 21/44* (2013.01)
*G06F 21/30* (2013.01)
*G06F 21/55* (2013.01)

(52) U.S. Cl.
CPC .............. *G06F 21/44* (2013.01); *G06F 21/30* (2013.01); *G06F 21/55* (2013.01); *G06F 21/554* (2013.01)

(58) Field of Classification Search
USPC ........... 701/1, 24, 29, 36, 48, 49, 29.1, 29.4, 701/29.6, 31.4, 31.7, 32.6, 32.7, 32.8,
(Continued)

(56) References Cited

U.S. PATENT DOCUMENTS

| 4,543,569 A | 9/1985 | Karlstrom |
| 5,081,667 A | 1/1992 | Drori et al. |

(Continued)

FOREIGN PATENT DOCUMENTS

| CN | 1863052 | 11/2006 |
| CN | 101291229 A | 10/2008 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Dale Hilgendorf
(74) *Attorney, Agent, or Firm* — Jennifer Stec; Brooks Kushman P.C.

(57) ABSTRACT

In one or more embodiments, a vehicle resource usage control system includes a vehicle computer having security policies that define usage rules for one or more vehicle resources. One or more devices communicating with the vehicle computer may have installed in memory software applications that use one or more vehicle resources for operation. Programmed instructions may be received that define which of the one or more vehicle resources the software applications use for operation. These programmed instructions may be associated with the one or more security policies. The security policy associated with the software applications may be determined based on the programmed instructions. Operation of the software applications may be permitted according to the security policy.

19 Claims, 5 Drawing Sheets

(58) Field of Classification Search
USPC ......... 701/33.2, 34.4, 33; 700/279; 713/151, 713/152, 161, 164, 165; 340/426.13; 726/6, 10; 709/245, 249

See application file for complete search history.

(56) References Cited

U.S. PATENT DOCUMENTS

| | | | |
|---|---|---|---|
| 5,467,070 A | 11/1995 | Drori et al. | |
| 5,513,107 A | 4/1996 | Gormley | |
| 5,627,510 A | 5/1997 | Yuan | |
| 5,635,916 A | 6/1997 | Bucholtz et al. | |
| 5,655,081 A * | 8/1997 | Bonnell et al. | 709/202 |
| 5,734,336 A | 3/1998 | Smithline | |
| 5,776,031 A | 7/1998 | Minowa et al. | |
| 5,828,319 A | 10/1998 | Tonkin et al. | |
| 5,874,889 A | 2/1999 | Higdon et al. | |
| 5,959,540 A | 9/1999 | Walter | |
| 6,018,291 A | 1/2000 | Marble et al. | |
| 6,133,825 A | 10/2000 | Matsuoka | |
| 6,177,866 B1 | 1/2001 | O'Connell | |
| 6,198,996 B1 | 3/2001 | Berstis | |
| 6,263,282 B1 | 7/2001 | Vallancourt | |
| 6,268,804 B1 | 7/2001 | Janky et al. | |
| 6,271,745 B1 | 8/2001 | Anzai et al. | |
| 6,282,226 B1 | 8/2001 | Furukawa | |
| 6,434,455 B1 * | 8/2002 | Snow et al. | 701/31.4 |
| 6,434,486 B1 | 8/2002 | Studt et al. | |
| 6,438,491 B1 | 8/2002 | Farmer | |
| 6,539,078 B1 | 3/2003 | Hunt et al. | |
| 6,574,734 B1 | 6/2003 | Colson et al. | |
| 6,590,495 B1 | 7/2003 | Behbehani | |
| 6,668,221 B2 | 12/2003 | Harter, Jr. et al. | |
| 6,679,702 B1 | 1/2004 | Rau | |
| 6,690,260 B1 | 2/2004 | Ashihara | |
| 6,737,963 B2 | 5/2004 | Gutta et al. | |
| 6,754,562 B2 * | 6/2004 | Strege et al. | 700/279 |
| 6,785,542 B1 * | 8/2004 | Blight et al. | 709/245 |
| 6,810,309 B2 | 10/2004 | Sadler et al. | |
| 6,853,919 B2 | 2/2005 | Kellum | |
| 6,859,718 B2 * | 2/2005 | Fritz et al. | 701/100 |
| 6,871,145 B2 | 3/2005 | Altan et al. | |
| 6,906,619 B2 | 6/2005 | Williams et al. | |
| 6,941,194 B1 * | 9/2005 | Dauner et al. | 701/36 |
| 7,057,501 B1 | 6/2006 | Davis | |
| 7,075,409 B2 | 7/2006 | Guba | |
| 7,102,496 B1 | 9/2006 | Ernst, Jr. et al. | |
| 7,124,027 B1 | 10/2006 | Ernst, Jr. et al. | |
| 7,148,790 B2 | 12/2006 | Aoyama et al. | |
| 7,161,563 B2 | 1/2007 | Vitale et al. | |
| 7,173,903 B2 * | 2/2007 | Remboski et al. | 370/225 |
| 7,194,069 B1 | 3/2007 | Jones et al. | |
| 7,207,041 B2 | 4/2007 | Elson et al. | |
| 7,228,213 B2 | 6/2007 | Sakai et al. | |
| 7,246,062 B2 | 7/2007 | Knott et al. | |
| 7,266,438 B2 | 9/2007 | Kellum et al. | |
| 7,337,113 B2 | 2/2008 | Nakagawa et al. | |
| 7,340,332 B2 | 3/2008 | Underdahl et al. | |
| 7,356,394 B2 | 4/2008 | Burgess | |
| 7,366,892 B2 * | 4/2008 | Spaur et al. | 713/151 |
| 7,375,620 B2 | 5/2008 | Balbale et al. | |
| 7,391,305 B2 | 6/2008 | Knoll et al. | |
| 7,484,008 B1 * | 1/2009 | Gelvin et al. | 701/408 |
| 7,565,230 B2 | 7/2009 | Gardner et al. | |
| 7,602,782 B2 | 10/2009 | Doviak et al. | |
| 7,783,475 B2 | 8/2010 | Neuberger et al. | |
| 7,812,712 B2 | 10/2010 | White et al. | |
| 7,826,945 B2 | 11/2010 | Zhang et al. | |
| 8,050,817 B2 | 11/2011 | Moinzadeh et al. | |
| 8,050,863 B2 | 11/2011 | Trepagnier et al. | |
| 8,089,339 B2 | 1/2012 | Mikan et al. | |
| 8,232,864 B2 | 7/2012 | Kakiwaki | |
| 8,237,554 B2 | 8/2012 | Miller et al. | |
| 8,258,939 B2 | 9/2012 | Miller et al. | |
| 8,301,108 B2 | 10/2012 | Naboulsi | |
| 8,305,189 B2 | 11/2012 | Miller et al. | |
| 8,311,722 B2 | 11/2012 | Zhang et al. | |
| 2002/0013650 A1 | 1/2002 | Kusafuka et al. | |
| 2002/0031228 A1 | 3/2002 | Karkas et al. | |
| 2002/0096572 A1 | 7/2002 | Chene et al. | |
| 2002/0097145 A1 | 7/2002 | Tumey et al. | |
| 2003/0004730 A1 | 1/2003 | Yuschik | |
| 2003/0043750 A1 | 3/2003 | Remboski et al. | |
| 2003/0055643 A1 | 3/2003 | Woestemeyer et al. | |
| 2003/0079123 A1 | 4/2003 | Mas Ribes | |
| 2003/0217148 A1 | 11/2003 | Mullen et al. | |
| 2003/0220725 A1 | 11/2003 | Harter, Jr. et al. | |
| 2003/0231550 A1 | 12/2003 | MacFarlane | |
| 2004/0046452 A1 | 3/2004 | Suyama et al. | |
| 2004/0073367 A1 | 4/2004 | Altan et al. | |
| 2004/0088205 A1 | 5/2004 | Geisler et al. | |
| 2004/0124968 A1 | 7/2004 | Inada et al. | |
| 2004/0176906 A1 | 9/2004 | Matsubara et al. | |
| 2004/0227642 A1 | 11/2004 | Giles et al. | |
| 2004/0236475 A1 | 11/2004 | Chowdhary | |
| 2005/0021597 A1 | 1/2005 | Derasmo et al. | |
| 2005/0033517 A1 | 2/2005 | Kondoh et al. | |
| 2005/0125110 A1 | 6/2005 | Potter et al. | |
| 2005/0134115 A1 | 6/2005 | Betts, Jr. et al. | |
| 2005/0177635 A1 | 8/2005 | Schmidt et al. | |
| 2005/0190039 A1 | 9/2005 | Aoyama et al. | |
| 2005/0193212 A1 | 9/2005 | Yuhara | |
| 2005/0261816 A1 | 11/2005 | DiCroce et al. | |
| 2006/0056663 A1 | 3/2006 | Call | |
| 2006/0142917 A1 | 6/2006 | Goudy | |
| 2006/0150197 A1 | 7/2006 | Werner | |
| 2006/0156315 A1 | 7/2006 | Wood et al. | |
| 2006/0220904 A1 | 10/2006 | Jarlengrip | |
| 2006/0250224 A1 | 11/2006 | Steffel et al. | |
| 2006/0293813 A1 | 12/2006 | Nou | |
| 2007/0027595 A1 | 2/2007 | Nou | |
| 2007/0050854 A1 | 3/2007 | Cooperstein et al. | |
| 2007/0072616 A1 | 3/2007 | Irani | |
| 2007/0100514 A1 | 5/2007 | Park | |
| 2007/0103339 A1 | 5/2007 | Maxwell et al. | |
| 2007/0255568 A1 | 11/2007 | Pennock | |
| 2008/0070616 A1 | 3/2008 | Yun | |
| 2008/0109653 A1 | 5/2008 | Yokohama | |
| 2008/0148374 A1 | 6/2008 | Spaur et al. | |
| 2008/0150683 A1 | 6/2008 | Mikan et al. | |
| 2008/0275604 A1 | 11/2008 | Perry et al. | |
| 2009/0030605 A1 | 1/2009 | Breed | |
| 2009/0045928 A1 | 2/2009 | Rao et al. | |
| 2009/0096596 A1 | 4/2009 | Sultan et al. | |
| 2009/0167524 A1 | 7/2009 | Chesnutt et al. | |
| 2009/0184800 A1 | 7/2009 | Harris | |
| 2009/0195370 A1 * | 8/2009 | Huffman et al. | 340/426.13 |
| 2009/0275281 A1 | 11/2009 | Rosen | |
| 2009/0309709 A1 | 12/2009 | Bevacqua et al. | |
| 2010/0004818 A1 | 1/2010 | Phelan | |
| 2010/0007479 A1 | 1/2010 | Smith | |
| 2010/0013596 A1 | 1/2010 | Kakiwaki | |
| 2010/0030458 A1 | 2/2010 | Coughlin | |
| 2010/0039224 A1 | 2/2010 | Okude et al. | |
| 2010/0057586 A1 | 3/2010 | Chow | |
| 2010/0075656 A1 | 3/2010 | Hawarter et al. | |
| 2010/0097178 A1 | 4/2010 | Pisz et al. | |
| 2010/0148923 A1 | 6/2010 | Takizawa | |
| 2010/0178872 A1 | 7/2010 | Alrabady et al. | |
| 2010/0191535 A1 | 7/2010 | Berry et al. | |
| 2010/0191973 A1 | 7/2010 | Huntzicker et al. | |
| 2010/0321203 A1 | 12/2010 | Tieman et al. | |
| 2011/0009107 A1 | 1/2011 | Guba et al. | |
| 2011/0071720 A1 | 3/2011 | Schondorf et al. | |
| 2011/0071725 A1 | 3/2011 | Kleve et al. | |
| 2011/0071734 A1 | 3/2011 | Van Wiermeersch et al. | |
| 2011/0102146 A1 | 5/2011 | Giron | |
| 2011/0105097 A1 | 5/2011 | Tadayon et al. | |
| 2011/0106374 A1 | 5/2011 | Margol et al. | |
| 2011/0112969 A1 | 5/2011 | Zaid et al. | |
| 2011/0148574 A1 | 6/2011 | Simon et al. | |
| 2011/0166748 A1 | 7/2011 | Schneider et al. | |
| 2011/0213629 A1 | 9/2011 | Clark et al. | |
| 2011/0215921 A1 | 9/2011 | Ben Ayed et al. | |
| 2011/0275321 A1 | 11/2011 | Zhou et al. | |

(56) References Cited

U.S. PATENT DOCUMENTS

| | | |
|---|---|---|
| 2011/0295444 A1 | 12/2011 | Westra et al. |
| 2012/0041633 A1 | 2/2012 | Schunder et al. |
| 2012/0054036 A1 | 3/2012 | Nam et al. |
| 2012/0071140 A1 | 3/2012 | Oesterling et al. |
| 2012/0139760 A1 | 6/2012 | Bevacqua et al. |
| 2012/0157069 A1 | 6/2012 | Elliott et al. |
| 2012/0280786 A1 | 11/2012 | Miller et al. |
| 2012/0284702 A1 | 11/2012 | Ganapathy et al. |
| 2012/0293317 A1 | 11/2012 | Hanna et al. |
| 2012/0313768 A1 | 12/2012 | Campbell et al. |
| 2013/0005302 A1 | 1/2013 | Ozaki |
| 2013/0162421 A1 | 6/2013 | Inaguma et al. |
| 2013/0200999 A1 | 8/2013 | Spodak et al. |

FOREIGN PATENT DOCUMENTS

| | | |
|---|---|---|
| CN | 101596895 A | 12/2009 |
| DE | 102007046270 A1 | 4/2009 |
| EP | 0449471 | 10/1991 |
| EP | 0971463 | 1/2000 |
| EP | 1095527 | 5/2001 |
| JP | 2008195253 | 8/2008 |
| JP | 2008303630 | 12/2008 |
| WO | WO0125572 A1 | 4/2001 |
| WO | 2009132977 A1 | 11/2009 |
| WO | 2009158469 | 12/2009 |
| WO | 2012015403 | 2/2012 |

OTHER PUBLICATIONS

Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
K. Whitfield, A hitchhiker's guide to the telematics ecosystem, Automotive Design & Production, Oct. 2003.
Autobiometrics, COM, US Distributor for ATRD Biometric Immobilizer, http://www.autobiometrics.com, Jul. 6, 2011.
Sales@usasupremetech.com, In the U.S. a Car is Stolen Every 26 Seconds, The Wave of the Future, Biometrics Authentication, An Introduction.
Driver Focus—Telematics Working Group, Statement of Principles, Criteria and Verification Procedures on Driver Interactions with Advanced In-Vehicle Information and Communications Systems, Including 2006 Updated Sections, Jun. 26, 2006.

* cited by examiner

METHODS AND SYSTEMS FOR IMPLEMENTING AND ENFORCING SECURITY AND RESOURCE POLICIES FOR A VEHICLE

BACKGROUND

1. Technical Field

Various embodiments relate to security controls associated with the use of a vehicle computing system. In some embodiments, the security controls relate to regulating the use of vehicle resources when using applications installed on one or more devices via the vehicle computing system. The one or more devices may be remote from the vehicle computing system.

2. Background Art

Various examples exist in the field of regulating the use of computer resources and implementing computer security policies. For example, U.S. Pat. No. 7,207,041 to Elson et al. ('041 Patent) discloses an open platform architecture for shared resource access management. The '041 Patent discloses a redirection module in kernel space which receives requests for access to resources from applications in user space. The redirection module routes signals representative of the received requests to a device driver interface in user space. Components of the device driver interface include resource management modules and device drivers that correspond to available resources. The resource management modules generate queries to the device drivers regarding availability of the requested resources. Upon receipt of resource status information from the device drivers, components of the device driver interface generate schedules for granting access to the requested resources. Further, the device driver interface components control access to the resources in accordance with the generated schedules including issuing responses to the requesting applications and the device drivers of the requested resources.

U.S. Patent Publication No. 2007/0050854 to Cooperstein et al. ('854 Publication) discloses resource based dynamic security authorization. Access to a resource by sandboxed code is dynamically authorized by a client security system based on a resource based policy. A sandboxed application running on a client is granted access to a resource based on a resource based policy despite denial of the access based on a static policy associated with the client security system. The granting of access coincides with the determination that the threat to a user or the user's information is not increased should the access be granted.

U.S. Patent Publication No. 2008/0148374 to Spaur et al. discloses a telematics system that includes a security controller. The security controller is responsible for ensuring secure access to and controlled use of resources in the vehicle. The security measures relied on by the security controller can be based on digital certificates that grant rights to certificate holders, e.g., application developers. In the case in which applications are to be used with vehicle resources, procedures are implemented to make sure that certified applications do not jeopardize vehicle resources' security and vehicle users' safety. Relationships among interested entities are established to promote and support secure vehicle resource access and usage. The entities can include vehicle makers, communication service providers, communication apparatus vendors, vehicle subsystem suppliers, application developers, as well as vehicle owners/users. At least some of the entities can be members of a federation established to enhance and facilitate secure access and usage of vehicle resources.

SUMMARY

One aspect includes a vehicle resource usage control system. The system may include a vehicle computer that has one or more security policies defining usage rules for one or more vehicle resources. The one or more security policies are may be default or specific policies. In some embodiments, the vehicle computer may be a virtual machine computer embodied in a computer-readable medium.

The vehicle computer may be configured to communicate with one or more devices having installed in memory one or more software applications that use one or more vehicle resources for operation. The computer may be further configured to receive programmed instructions defining which of the one or more vehicle resources the software application uses for operation. The programmed instructions may be associated with the one or more security policies. The vehicle computer may be further configured to determine the security policy associated with the one or more software applications based on the programmed instructions. Operation of the one or more software applications according to the security policy may be permitted.

In one embodiment, the vehicle computer may include a resource usage timer. As such, the security policy may define a time limit for executing the programmed instructions. Additionally, the vehicle computer may be further configured to transmit an error message if execution of the programmed instructions exceeds the time limit. Additionally, the vehicle computer may be further configured to terminate execution of the programmed instructions.

Another aspect may include a method for controlling usage of vehicle resources by one or more software applications installed on one or more devices communicating with a vehicle computer. The method may include assigning a vehicle resource access level for one or more vehicle resources. One or more security policies defining usage rules for one or more vehicle resources based on the vehicle resource access level may be established. The vehicle resource access level may define general access to vehicle resources or specific access to vehicle resources and may be based on a sensitivity of the functionality of the vehicle resources. A specific access level may include access to additional vehicle resources compared to the general access level.

The method may further include receiving programmed instructions defining which of the one or more vehicle resources the one or more software applications use for operation. A security policy may be associated with the one or more software applications based on the programmed instructions. Operation of the one or more software applications may be permitted according to the security policy.

In one embodiment, the method may further include receiving an application programming interface for communicating with the one or more vehicle modules. The one or more security policies may be dynamic such that the one or more security policies are established based on receiving the application programming interface.

Another aspect may include a method that includes receiving instructions over a general protocol to use vehicle resources for operating on a vehicle computer an application installed on two or more devices having different communication protocols. The instructions may include a service or operation request for an application from the two or more devices. In one embodiment, the instructions may be stored on the vehicle computer and, after the instructions have been validated, the instructions may be removed.

A usage security policy associated with the application may be determined based on an association between the application and the security policy. Data may be exchanged data over the general transport protocol for operating the application on the vehicle computer based on the security policy.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

There are inherent risks in using untrusted applications on a computing device. For example, untrusted applications may contain malicious code, exhaust computing resources such as computer memory, or otherwise disrupt proper operation of the computing device. In this context, an untrusted application is an application that is stored remotely from the computing device and is downloaded to and/or operated from the computing device such as a personal computer, a vehicle computer, a mobile device (such as a cellphone, PDS, smartphone, etc), a personal media player, and the like. For example, software that is downloaded to a personal computer over the Internet may be an untrusted application.

Untrusted applications can be used in a variety of environments. One example is in and/or with a vehicle computer such as the SYNC System from THE FORD MOTOR COMPANY. In this environment, applications installed on a mobile device (also called "mobile applications") may be operated by a user from the vehicle computer (e.g., SYNC) via voice commands and/or button presses. The vehicle computer communicates with a number of vehicle modules such as the powertrain control module (PCM), the airbag control module (ACM), the engine control unit (ECU), and other like modules. As such, untrusted applications that may be used in a vehicle environment must not have unfettered access to vehicle resources. Therefore, untrusted applications should be identified and the use of vehicle resources by the untrusted applications regulated.

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

It will be appreciated that while the various embodiments are described with respect to use of a computing system in an automobile, there may be other environments in which untrusted applications may be utilized. Non-limiting examples of such environments include a home, an office, a school, an airplane, a train, a bus, a library, and other like environments.

Figure 1:
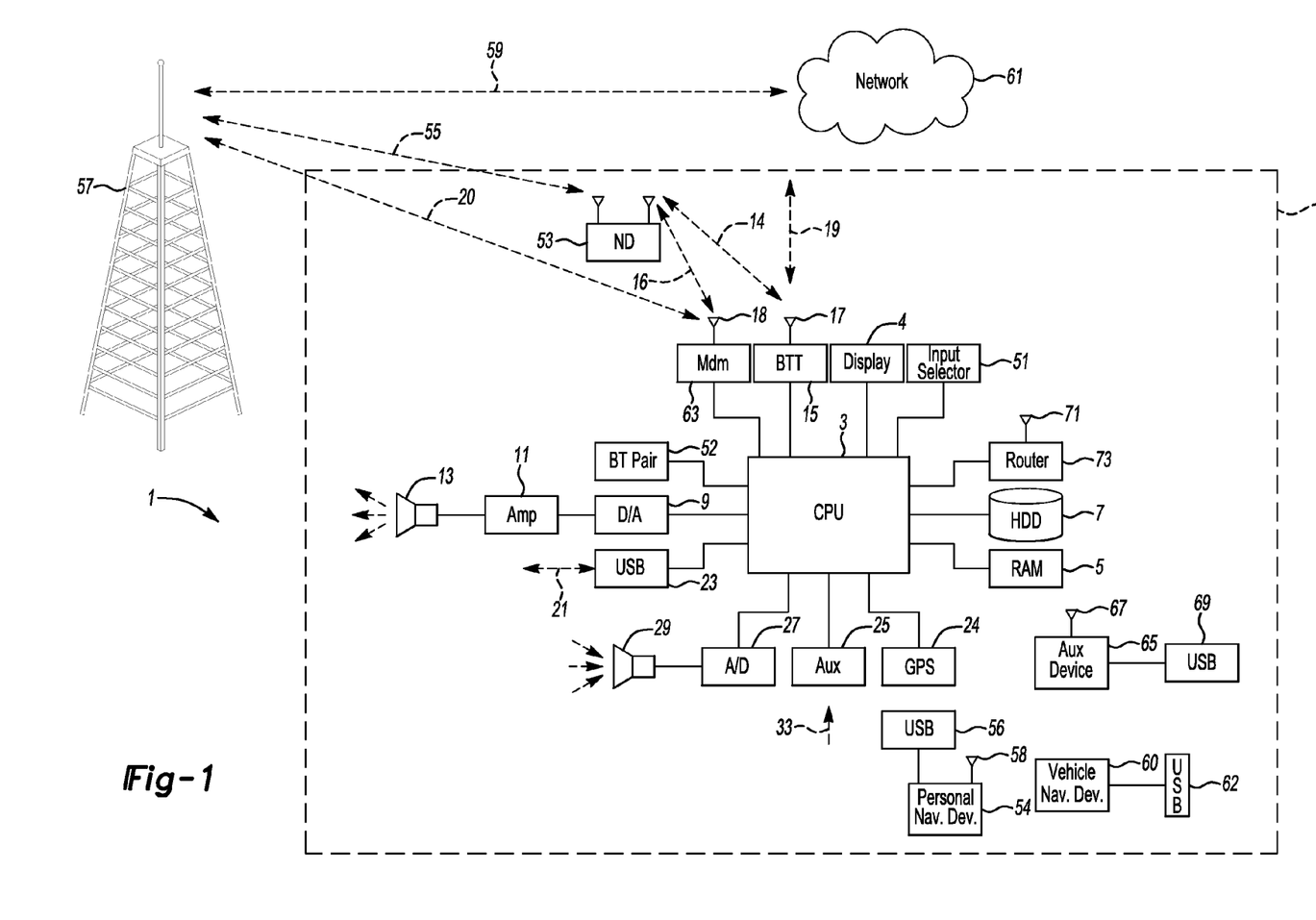
FIG. 1 illustrates a block topology of a vehicle computing system.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH Transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
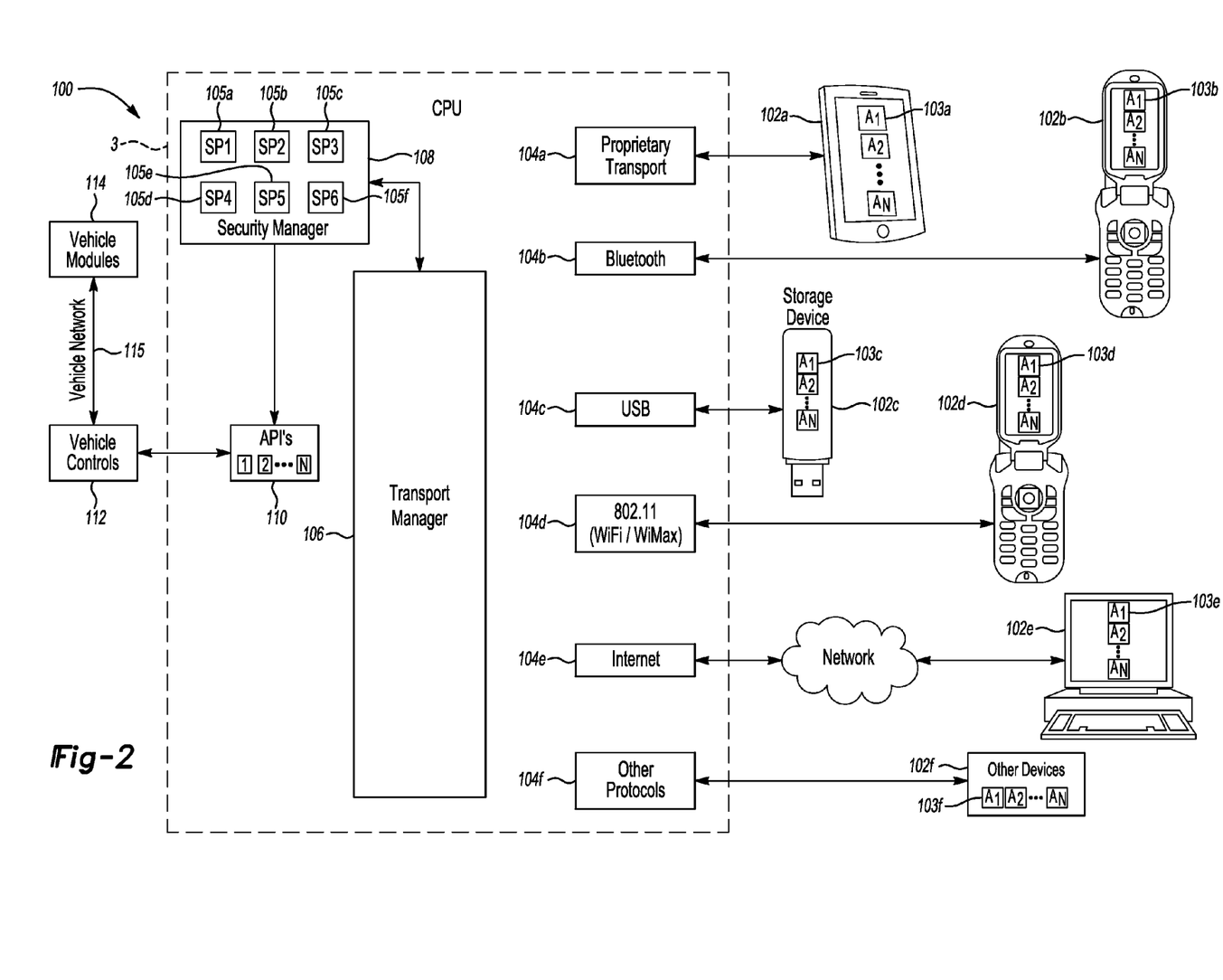
FIG. 2 illustrates a system architecture for enforcing resource and security policies of the vehicle computing system of FIG. 1 against one or more software applications operated from a vehicle.

FIG. 2 illustrates a non-limiting framework in which a user may interface multiple devices with a vehicle computing system (VCS) 1. More specifically, the system 100 may permit a user to interface the applications 103a-f installed on the devices 102a-f with the VCS 1 for operating the applications 103a-f through the VCS 1. Operating the applications 103a-f may include, but is not limited to, activating the applications, inputting commands and instructions (via voice, button presses, etc.), and receiving outputs (e.g., visual, graphical, textual, audible, and other like outputs).

It will be appreciated, however, that the architecture of FIG. 2 and associated description is non-limiting. For example, and without limitation, operation of the applications 103a-f may additionally or alternatively occur through the devices 102a-f. For example, and without limitation, the inputs, outputs, and commands may occur at the device 102a-f.

It will be further appreciated the various embodiments described with respect to FIG. 2 may be used additionally or alternatively for telematics support. As a non-limiting example, the various embodiments can be used when exchanging vehicle health report data. As another non-limiting example, the various embodiments can be used when exchanging licensing data for an application 103a-f. As another non-limiting example, the various embodiments may be used for remote door unlock.

Referring now to FIG. 2, there may be one or more devices 102a-f that may interface with the VCS 1. However, for purposes of illustration and clarity, FIG. 2 is shown with multiple devices 102a-f. Non-limiting examples of such devices may include cellular phones, handheld diagnostic tools, personal computers, smartphones, personal digital assistants (PDA), media devices (e.g., and without limitation Mp3 players), portable memory devices (e.g., and without limitation, USB thumbdrives, memory cards/sticks, SLOT-MUSIC cards, and other suitable memory devices) and/or adapters for receiving these memory devices, and other devices that may be now, or hereafter, known.

The applications 103a-f installed on the devices 102a-f may be factory installed on the device 102a-f or installed by a user after purchase of the device 102a-f. For example, and without limitation, the user may install the application from a computer-readable medium (e.g., a CD or thumbdrive) or download the application over the Internet. In some embodiments, the user may develop the application 103a-f.

A user may include, but is not limited to, a consumer, a vehicle dealership (and individuals employed by the dealership), or a service shop (and individuals employed by the serve shop). Non-limiting examples of applications 103a-f that may be installed to the devices 102a-f may include vehicle diagnostic applications, communication applications (e.g., and without limitation, electronic mail, VoIP, and text messages), entertainment applications (e.g., and without limitation, multi-media streaming, videos, music, games, etc.), social networking applications, location-based applications, Internet applications, personal advertisement-based applications, and others.

Each device 102a-f may communicate data through one or more communication channels using one or more communication protocols 104a-f. Non-limiting examples of such communication protocols 104a-f may include BLUETOOTH protocols, 802.11 protocols, TCP/IP, proprietary protocols (such as, without limitation, APPLE CORPORATION's iAP protocol), mass storage protocols (e.g., USB protocols), USB-based networking protocols (e.g., and without limitation, USE-Serial or USB-RNDIS), and other protocols now, and hereafter, known. It should be understood that devices 102a-f may be capable of communicating data using multiple communication protocols (e.g., and without limitation, BLUETOOTH and 802.11).

This relationship between the VCS 1 and the devices 102a-f may be referred to as a network. In some embodiments, the relationship between the devices 102a-f and the VCS 1 may create an "ad-hoc" network.

Referring back to FIG. 2, with respect to BLUETOOTH-ready devices, each device may also include one or more BLUETOOTH profiles that define with which devices the BLUETOOTH-ready device may communicate. Profile may be standard profiles (such as A2DP, HFP, SDAP, and HSP) or customized profiles.

Devices 102a-f may establish a connection with the VCS 1 using a communication channel described above. In one embodiment, the devices 102a-f may listen for a connection request from the VCS 1. In other embodiments, the VCS 1 may listen for connection requests from the devices 102a-f. When a connection is established, a data transport manager 106 (which may or may not be implemented to CPU 3 of the VCS 1 as software) may receive the messages/data communicated from the one or more applications 103a-f (via device 102a-f) and process the messages/data for further transmission.

In some embodiments, the devices 102a-f may be simultaneously connected to the VCS 1. In other embodiments, the device 102a-f may establish individual and separate (i.e., not simultaneous) connections.

The transport manager 106 may transmit this data to the security manager 108. Accordingly, the transport manager 106 may facilitate the communication between the device 102a-f and the security manager 108. Further details of the security manager will be described below. In some embodiments, the transport manager may also communicate with a data manager (not shown) which may communicate the data to the security manager. The data manager may store system data available between applications in a database structure.

Non-limiting examples of the duties of the transport manager 106 may include abstracting (i.e., standardizing) the communication protocols 104a-f and passing the following non-limiting information: data, transportation state changes, discovered applications, and start requests. The transport manager 106 may accomplish these duties as the interface for connecting to a device 102a-f with a given name over a given communication channel 104a-f. More specifically, transport manager 106 may send and/or receive data over an existing session. A session may be a logical connection between an application 103a-f on device 102a-f and the VCS 1. Further, the transport manager 106 may maintain various connection mappings, including a mapping between connections and all active sessions over a given connection and a mapping between connections and corresponding communication channels 104a-f. A "connection" may be a connection between the transport layers of the devices 102a-f and the VCS 1. Accordingly, transport manager may facilitate the exchange of data between the applications 103a-f and the VCS 1 over any one of the communication protocols 104a-f used to communicate data to/from the device 102a-f.

The transport manager 106 may further receive incoming connections from the device 102a-f. The transport manger 106 may determine and manage the connection for each communication protocol 104a-f. In some embodiments, this may be performed by a data transport plug-in. A plug-in may exist for proprietary protocols, BLUETOOTH protocols, 802.11 protocols, and the like. In some embodiments, the plug-in may be implemented as a dynamic link library (DLL).

The connection established by the transport manager 106 may permit data to be sent and/or received over an existing connection (as defined above). This interface may be independent of the underlying communication transport protocol 104a-f. Accordingly, capabilities for current and new communication channels 104a-f may be provided.

The transport manager 106 may further determine the type of service that is requested from the applications 103a-f. A service may be a heartbeat (HB), a remote procedure call (RPC), or a bulk service. Other non-limiting services may include media streaming, use of application-specific transport protocols (e.g., applications may have specific domain protocols), use of other protocols (such as HTTP, FTP, IRC, SOAP, and IMAP), and other suitable service types. More generally, a service may indicate the type of action an application 103a-f may be requesting. In some embodiments, this service type determination may be performed by a separate protocol module which may be a part of the transport manager 106. In other embodiments, the protocol module may not be a part of the transport manager 106, but may be communicating with it.

The transport manager 106 may facilitate data exchange between the application 103a-f and the VCS 1 through a general transport protocol stored in the transport manager 106. The protocol may be divided into two layers (e.g., a higher layer and a lower layer). A higher layer may contain the function calls required to accomplish device communication and system control flow. A lower layer may provide the basic communication functions. This lower layer may be agnostic of the hardware and system details. Accordingly, this data transport protocol may be "transport agnostic." In this way, the data transport protocol may be a dynamic protocol such that it may support expandability without significant (or any) changes to its architecture. Thus, instructions (i.e., data) from the applications 103a-f may be transported via the data transport protocol regardless of which of the communications protocols 104a-f (i.e., both present and future communication protocols) the device 102a-f uses for transporting data.

For example, and without limitation, one device may operate application 103a-f using BLUETOOTH (e.g., using the Radio Frequency Communication (RFComm) and Logical Link Control and Adaptation (L2CAP) protocols) while another device may operate applications 103a-f using a propriety protocol (such as APPLE'S iAP). The data transport protocol facilitates operation of the applications on the respective devices 102a-f from VCS 1 without regard to the data communication channel 103a-f used by each device. From the perspective of a user, the application on a device 102a-f may be used seamlessly. From the perspective of a developer of the application 103a-f, the application does not need to be individually developed based on the differing communication protocols 104a-f.

The security manager 108 may receive data from the transport manager 106 to ensure that application-specific policies and/or default security policies are being enforced. In this way, applications 103a-f may not obtain greater access to the resources of VCS 1 than is required by the applications 103a-f. Further, based on the security policies of the security manager 108, each application may be confined to operate within its "allowance" parameters. In one embodiment, the security policy enforcement may be viewed as a "sandbox" environment.

By way of example, if a user requests to operate a music program (e.g., PANDORA) from a device 102a-f, the security manager 108 may determine the use constraints (i.e., boundaries) with respect to VCS resources of the music program based on the computer-readable instructions (e.g., application scripts) from the application 103a-f. More specifically, the constraints may state that the music program desires access to graphics and audio. Accordingly, the security manager 108 may permit access to these resources but not others (e.g., vehicle diagnostic resources). Accordingly, the constraints may be based on the particular function of the application.

Accordingly, the security manager 108 may determine which resources are being requested by an application 103*a-f* and block out access to other resources. Further, it may assess the policies defined for each incoming request from an application 103*a-f* to further restrict its access for the resource to which it has access.

In one embodiment, access to the VCS 1 resources (e.g., vehicle controls 112 and vehicle modules 114) may be accomplished through application programming interfaces (APIs) 110 installed on the VCS 1. As such, the security manager 108 may additionally define which APIs may be accessible and provide access control lists to restrict access to the APIs.

These APIs may be developed by the vehicle OEM. In one embodiment, the API's may be programmed as DLL's and programmed in the C or C++ programming languages. The APIs may additionally or alternatively be written in a scripting language. In some embodiments, the APIs may be written in the same language as the security manager 108. Furthermore, each API may include its own set of security parameters so that each can enforce unique policy restrictions.

Non-limiting examples of vehicle controls 112 may include text-to-speech (TTS) functionality, speech-to-text (STT) functionality, voice controls, button controls (e.g., steering wheel button controls and/or center stack button controls), and touchscreen button controls. Operation on one or more vehicle modules 114 may be accomplished in response to the use of the one or more vehicle controls 112. Data may be transmitted between the vehicle controls 112 and the vehicle modules 114 over communication link 115. In one embodiment, communication link may be a vehicle network 115. Non-limiting examples of vehicle modules 114 include powertrain control modules (PCM), body control modules (BCM), ABS control modules, infotainment modules, and the like. In additional or alternative embodiments, data may be transmitted to other vehicle modules 114 for audible, textual, and/or graphical output. These may include, but are not limited to, one or more displays (including, but not limited to, display 4, cluster screen displays (not shown) or rear entertainment displays (not shown)), speakers 13, or other like output modules in vehicle 31.

The APIs may be OEM developed APIs, third-party developed APIs and/or open APIs. Non-limiting examples of APIs and their non-limiting functions that may be installed on the VCS 1 are listed in Table 1 below.

TABLE 1

| API | Description/Function |
| --- | --- |
| Vehicle Interaction | Interaction through vehicle network interface layer; Interaction with the vehicle network (e.g., CAN); Diagnostic systems; GPS; Clock; Personalization; Cluster display; Button events; Door lock; Fuel/electric vehicle charging status. |
| Display | Menu interaction; Graphical widget interaction; Interaction with buttons; Access to display properties; |

TABLE 1-continued

| API | Description/Function |
| --- | --- |
| | Rear camera; Communications to rear entertainment; Hardware access to 3D GPU; Access to a web/html rendering engine. |
| Audio | Interaction with Text-To-Speech (TTS) Engine; Interaction with voice recognition module; Access to microphone audio stream; Digital audio playback; Push audio files for playback. |
| VCS System Management | Event registration and notification facilities; Internal database access to transient and persistent data (e.g., media and phone databases); Access to system state and application state information; Telematics queue. |
| System Administration | Extensions for providing functionality to various features of the VCS; Language selection and internationalization; System configuration parameters; Access to flash and external file systems; Connected device and indirect access. |
| Networking | Default socket access; Networking access; Events related to network availability |

Further details of the security manager 108 will now be described. The security manager 108 may be implemented in the VCS 1 as software. In one embodiment, the security manager 108 may mimic the native environment of the VCS 1 and, as such, serve as a virtual machine. In some embodiments, however, the security manager 108 may have access limited to certain native functionalities. These certain native functionalities may be related to the one or more APIs in Table 1. Non-limiting examples are as follows: push-to-talk, text-to-speech, user interface, language selection, the VCS display (including presenting information on the display, writing to the display, and reading information from the display), speech grammar modules, voice recognition modules, the microphone (via a sound capture API), audio function (including recording audio and transferring audio to an external device), image upload modules, and GPS.

The security manager 108 may support an event model. In this context, the security manager 108 may support a subscriber/publisher pattern of message transmission to provide for greater scalability. In some embodiments, events may be subscribed to by an event manager (not shown) which may notify the subscriber of the event. The event manager may be built into the security manager 108. The security manager 108 may additionally filter events or redefine system events already present. The security manager 108 may also be given access to predetermined events of the VCS 1. Non-limiting examples of predetermined events include power mode, voice recognition/text-to-speech, media/phone control, USB insertion/removal, keyboard, telematics, WiFi/network/roaming, audio state/request, button, climate, radio, cluster, GPS, date/time, fuel level, electric vehicle battery charge level, temperature, door status, emergency information, crash status, parking aid, seats, personalization, and data manager.

The security manager 108 may additionally regulate resource consumption of vehicle resources. As will be described in further detail below, this regulation may be enforced such that an application script (which may define the vehicle resources to which an application 103a-f can have access) may be terminated if it violates resource consumption regulations enforced by the security manager 108. It will be appreciated that the security manager 108 may regulate according to any other restriction that the security manager 108 has in place.

The security manager 108 may be programmed to limit access to vehicle resources by untrusted applications (i.e., applications 103a-f). Thus, the security manager 108 may be a shield against these untrusted applications that may otherwise affect the performance of the vehicle. In one embodiment, the security manager 108 may be programmed in a scripting language including, but not limited to, Java, .NET (Visual Basic, C#), ActionScript, JavaScript, LUA, Perl, or Python. In some embodiments, a script may be programmed (which may or may not based on the scripting language of the security manager 108) to the untrusted applications. This script (or, more generally, code) may define the resource constraints and other security parameters of the untrusted applications. In further embodiments, the untrusted application may be fully programmed in the scripting language and the security script may be a portion of the application code.

As described in further detail below, the security manager 108 may include security policy files associated with the script. These policy files may define the scope of the application's access to the vehicle resources. These policy files may also be associated with digital certificates. The digital certificates may individually define additional policy file limits.

In additional or alternative embodiments, security policies may be within the application 103a-f. For example, an application 103a-f may be subdivided into separate libraries (or components) and each library (or components) may be associated with a policy. It will be appreciated that different policies may be enforced at the same time. As one non-limiting example, a default policy, an application-specific policy, and a library-specific policy may all be enforced by the security manager 108.

In one embodiment, the security manager 108 may be flexible and dynamic such that the system framework (illustrated in FIG. 2) may be extended and upgraded to add new base functionality. This feature may allow new libraries to be loaded and made available dynamically on the VCS 1 at runtime rather than compile time. In one embodiment, these libraries may be dynamic link libraries (DLLs). In this way, upgrades may be feasible without adversely affecting devices with existing support. Therefore, through installation or download of the new libraries, new remote procedure calls may be registered or new APIs available to the security manager 108. The general transport protocol may assist in this expandability by transporting content and command controls from the transport manager 106 rather than the specific APIs.

The security manager 108 may perform additional non-limiting functions. As one example, the security manager 108 may receive and send data (i.e., events) from any one or more of the various communication protocols 104a-f. As described above, data exchange may be accomplished via the general transport protocol. As such, the security manager 108 may also be "transport agnostic."

The security manager 108 may also have the ability to fail gracefully when errors with the script occur. For example, in instances where the VCS 1 comprises different generations or versions, certain APIs (or vehicle controls) may not be available in earlier generations or versions. In such a scenario, the applications 103a-f may query the security manager 108 for the existence of certain APIs. An error message may be transmitted to the applications 103a-f if the API does not exist. Alternatively or additionally, an exception may be triggered by the security manager 108. This exception may be caught and the application 103a-f may recover from the error. Alternatively, if the exception is uncaught, the script may be terminated.

In certain embodiments, the error message transmitted to the application 103a-f may include information to perform application debugging. As a non-limiting example, a call stack trace may be provided in the error message to identify the location of the error. In certain embodiments, the call stack trace may be a partial call stack trace. Other examples of error handling will be described below with respect to FIG. 5.

Figure 3:
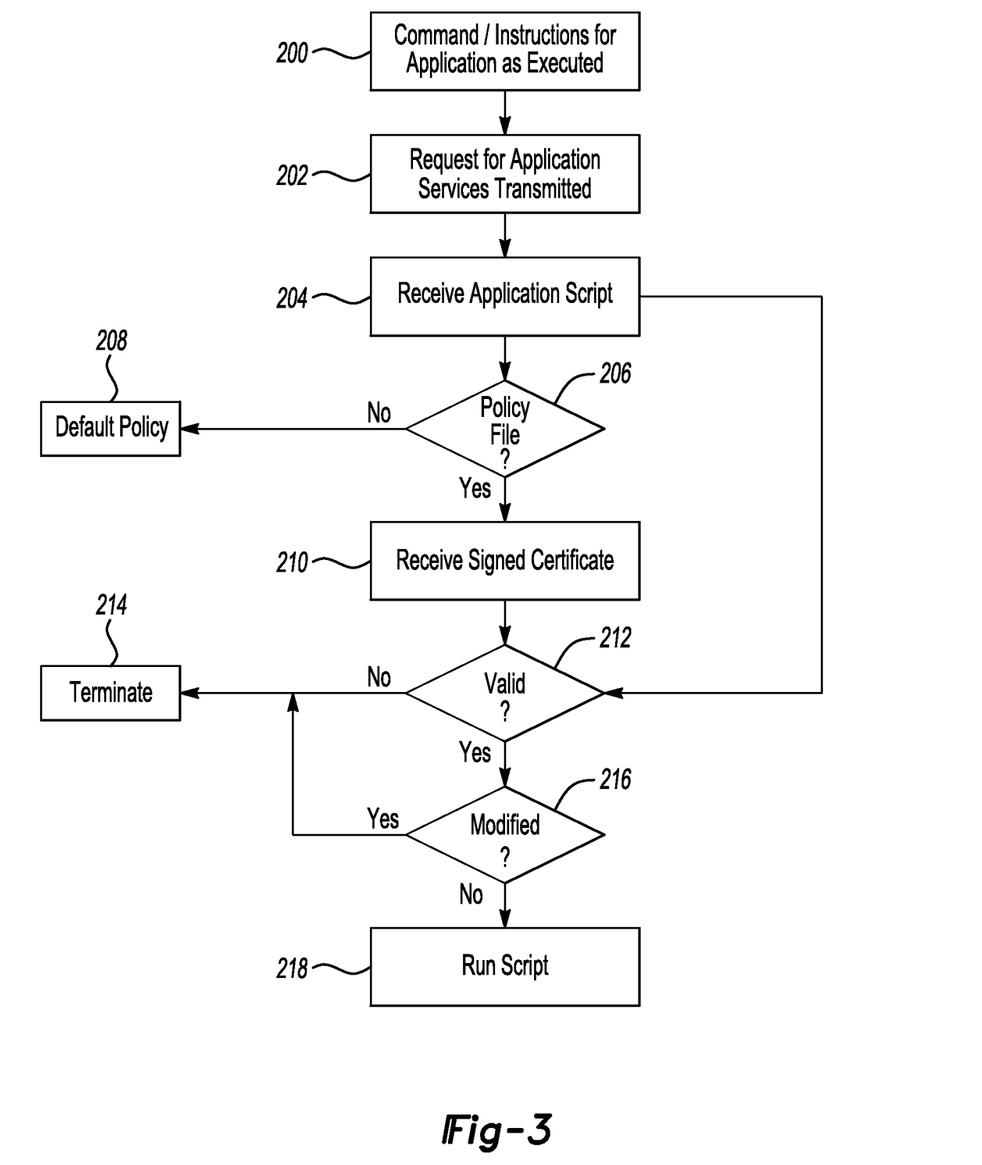
FIG. 3 is a process for implementing resource policies of the vehicle computing system against one or more software applications operated from a vehicle.

Referring now to FIG. 3, a process for implementing a security policy against a script is illustrated and described. It will be appreciated that the disclosure and arrangement of FIG. 3 may be modified or re-arranged to best fit a particular implementation of the various embodiments of the invention.

As illustrated in block 200, a command or instructions for executing an application 103a-f may be transmitted from device 102a-f. The command or instructions may be transmitted by the user (via a GUI and/or speech user interface or "SUI" of the VCS 1) and include, but is not limited to, activation of applications 103a-f, entering inputs, receiving outputs, and terminating the application 103a-f. The applications 103a-f may receive the user instructions and transmit the command or instructions as a service or operation instruction (block 202). The service or operation instructions may be transmitted via one or more service types described above. For purposes of illustration and description, FIG. 3 will be described in the context that the service or operation instruction is transmitted via a remote procedure call (RPC).

The RPC may be mapped to callbacks registered in the security manager 108. These callbacks may be registered in a table in the security manager 108 and mapped according the RPC instruction (or function) from the application 103a-f. Based on a lookup of the callback table, the callback may provide the script based functionality to perform the instruction on behalf of the application 103a-f. As such, the script may transmit and receive events. If the instruction did not exist, an error may be transmitted to the application 103a-f.

Callbacks may be based on the type of policy associated with a script received from the applications 103a-f by the security manager 108. The security policies may be a default security policy (i.e., a general policy) or an application specific policy. The security policies may also be "signed" security policies. Further details of these policies will be described below. It will be appreciated that "security policy" refers to vehicle resource usage policies and includes, but is not limited to, policies relating to malicious code, denial-of-service attacks, memory consumption, buffer overflow, flash usage, API restriction, processor usage, the use of watchdog timers, and other like security breaches.

As illustrated in block 204, the script from the application 103a-f may be received by the security manager 108. As illustrated in block 206, these scripts may be validated by determining whether a security policy 105a-f is associated with the script. These policies are illustrated in FIG. 2 as security policies ("SP") 105a-f.

In some embodiments, when the script is received by the security manager 108, the script may be temporarily copied to VCS memory for purposes of validating the script. When the script is run (block 218), the script may be deleted from the VCS 1. Thus, scripts may be run without installation to the VCS 1.

The security manager 108 may validate the script by determining if a policy file is associated with the script (block 206). If there is no policy file, a default security policy may be utilized (block 208). Otherwise, an application-specific policy may be utilized. In some embodiments, this determination (block 206) may relate to which policy file to use. That is, a policy file may exist for all scripts received by the security manager 108, but a determination may be made as to which policy file to assign. This may be based on the sensitivity of the VCS functionality that the application is requesting. For example, and without limitation, if the application requests use of vehicle resources that are of high sensitivity, such as diagnostic resources, the application may be required to have an application specific policy associated with it. It will be appreciated that this determination (i.e., the sensitivity of a vehicle resource) may be made in the embodiments described above and all other embodiments in which a policy file is associated with a script.

The security policy file may define which vehicle resource(s) the script may use. The script may be associated with an access level. For example, a general (or default) security policy may define the resources that all applications 103*a-f* may use. An application-specific security policy may define the specific resources that a specific application may use. In some embodiments, the access level may be based on a specificity value. In further embodiments, the specificity value may be based on a hierarchy. These values may be numeric, alphabetic, alphanumeric, and the like. For example, as the specificity value increases, access to a vehicle resource may be stricter. It should be understood that this example is for illustrative purposes and other systems may be implemented without departing from the scope and spirit of the various embodiments.

The specific resources may be in addition to the resources to which all application 103*a-f* may have access under the default policy. The application-specific policy file may also include a number of attributes that permit overriding default behavior. Non-exhaustive, non-limiting examples of these attributes include the ability to run in the background when other scripts may have focus, the ability to override normal resource constraints, the ability to override driver distraction restrictions, and the ability to override consumer validation of access to resources such as GPS and vehicle data.

Figure 4:
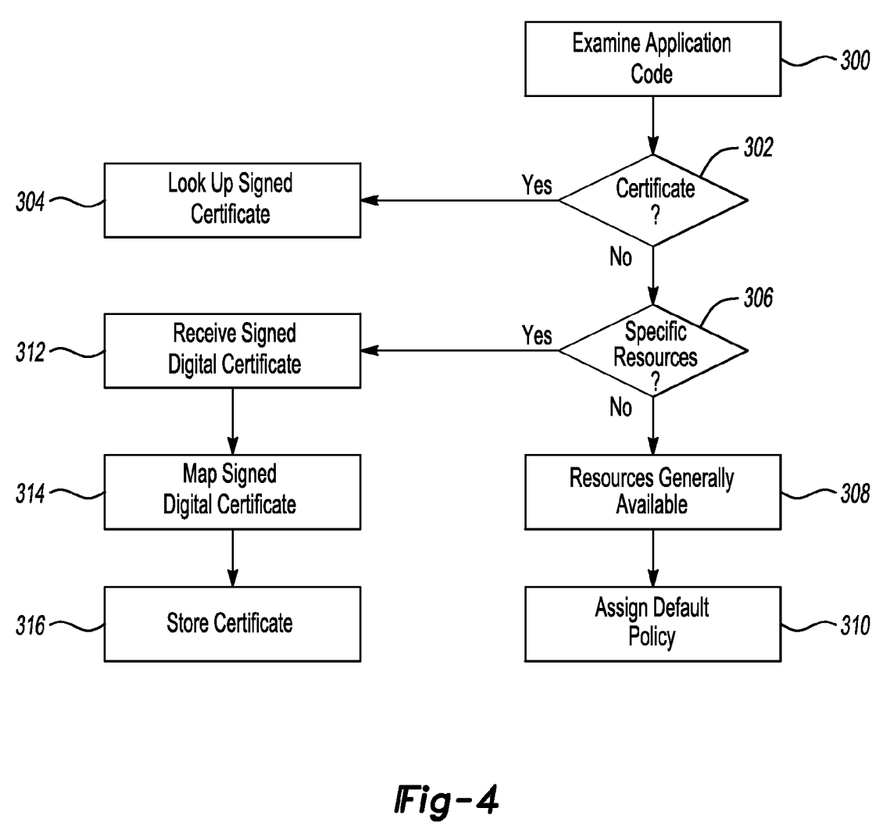
FIG. 4 is a process for determining a resource policy to apply to one or more software applications operated from a vehicle.

FIG. 4 illustrates the process for determining the type of policy file associated with a script. It will be appreciated that the disclosure and arrangement of FIG. 4 may be modified or re-arranged to best fit a particular implementation of the various embodiments of the invention.

The script may be examined by the security manager 108 when received (block 300) and a determination made whether the script has a signed digital certificate associated with it (block 302). If so, the security manager 108 may lookup the digital security certificate stored in a certificate store (block 304). Otherwise, a further determination may be made whether the script requires the use of a specific resource not generally available to all applications (block 306). In certain embodiments, the determination in block 302 may made to determine if the certificate is unmodified. As such, if the certificate has been modified, a new digital certificate may need to be received. In further embodiments, the determination in block 302 may be made based on the validity of the digital certificate. Thus, an invalid digital certificate may require that a new digital certificate be received.

If no specific resources are required, the script may be associated with a default policy (block 310). As such, the vehicle resources available to all applications may be made available to this application (block 308). In some embodiments, to use these resources, applications may not need a signed digital certificate. In other embodiments, all policies include a digital certificate.

If no certificate exists, a digital certificate may be received (block 312) signed for the application 103*a-f* according to methods known in the art. The signed digital certificate may be mapped to a counterpart certificate issued by an OEM (i.e., the vehicle manufacturer) (block 314) and stored on the VCS 1 (block 316).

Referring back to FIG. 3, where an application-specific policy is used, the signed digital certificate may be obtained by the security manager (block 210). A determination may be made whether the digital certificate is valid (block 212). If not, the script may terminate and an error message may be transmitted to the application 103*a-f* (block 214). Further details of the error detection process and message transmission will be described below with respect to FIG. 5. In some embodiments, an invalid digital certificate may trigger the operation illustrated in FIG. 4 and as described above.

If the digital certificate is valid, a further determination may be made whether it has been modified (block 216). If the certificate has been modified, the script may be terminated and an error message may be transmitted to the application 103*a-f* (block 214). In some embodiments, a modified digital certificate may trigger the operation illustrated in FIG. 4 and as described above. If the certificate is not modified, the script may be allowed to run, as illustrated in block 218.

In certain embodiments, the security manager 108 may also authenticate the script and ensure that it has not been modified. A secure hash may be associated with each script for this purpose. The secure hash may be included in the policy file.

Figure 5:
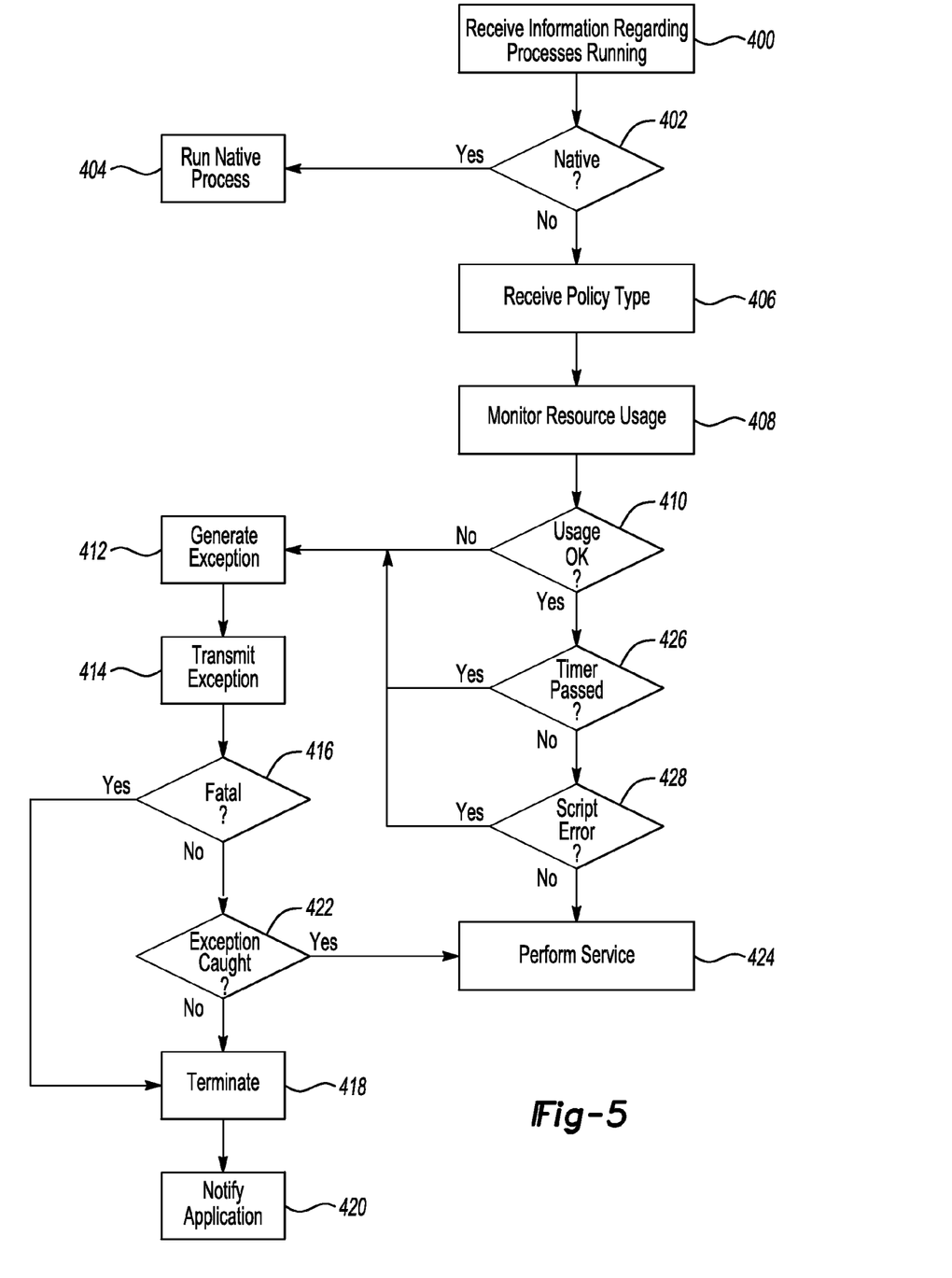
FIG. 5 is a process for enforcing one or more resource and security policies against one or more software applications operated from a vehicle.

FIG. 5 illustrates a process for managing a security policy when a script is run. Management may include, but is not limited to, enforcing resource restrictions/limitations and managing script errors. It will be appreciated that the disclosure and arrangement of FIG. 5 may be modified or re-arranged to best fit a particular implementation of the various embodiments of the invention.

Information regarding the policy type (i.e., default or application-specific) may be obtained (as described in FIGS. 3 and 4) by the security manager 108 (block 406). Based on the resources defined in the policy type, the vehicle resources to which the application 103*a-f* may have access is monitored (block 408).

In one embodiment, as illustrated in blocks 400-404, the VCS 1 may determine which processes may be running on the VCS 1 (block 400). This determination may be made for determining which processes have focus priority (i.e., displayed to the user), determining resource allocation strategy, error detection, and other like determination. For illustration, FIG. 5 shows a priority determination.

For example, native processes may have priority over security manager 108 processes with respect to focus and resource allocation. As such, the security manager 108 may not take screen focus away from a native process despite the fact that a script is running. As another non-limiting example, the security manager 108 may not monopolize a display (or HMI) when a native process requires use of the display. As described herein, native processes refer to processes native to the VCS 1 (i.e., processes not resulting from running one or more scripts).

As such, a determination may be made whether a native process is running or requesting use of a vehicle resource (block 402). If so, the native process may be run (block 404).

In one embodiment, scripts may be permitted to run in the background when a native process is running and/or when another script is running. Additionally or alternatively, multiple scripts may be run at the same time. Each script may or may not have different access to the vehicle resources. Further, each script may be given focus and may be able to determine when it is in focus. This may be determined when an application is shown on the display 4.

Referring now to block 410, the status of the script's usage of a vehicle resource may be determined. As a non-limiting example, the use of the VCS memory may be determined. As described above, the security manager 108 may ensure that the script does not exhaust the VCS memory through excessive memory consumption. The policy for a script may define that a limit or quota of memory consumption for the script. If the script exceeds this quota, the script may be terminated. In one embodiment, a warning notification may be transmitted to the application 103a-f at a predetermined threshold that the memory quota is about to be exceeded.

In certain embodiments, while a script may not fully utilize its allocated limit of a resource, other factors may exhaust such resources. Thus, resource usage may be limited based on timers, thread priority, and the like. While FIG. 5 illustrates the determination in the context of timers, it will be appreciated that this example is non-limiting and provided for illustration.

If the resource usage does not exceed some defined limit, a further determination may be made whether the timer has passed (block 426). This determination may ensure that the script does not enter into an infinite loop thereby exhausting VCS resources (such as memory or CPU). It will be appreciated that this feature of the security manager 108 may be suspended in certain instances (e.g., during a text-to-speech event).

In some embodiments, the security manager 108 may further determine if the script has a syntax or programming error (block 428). Such errors may generate exceptions and/or errors which may or may not cause the script to terminate.

It will be appreciated that the service or operation of the application 103a-f may be performed (block 424) after any, all, or some of the determinations as described above have been made.

The error detection and transmission process will now be described in further detail. As described above, when a failure has occurred, an exception may be generated (block 412) by the security manager 108 and transmitted to the application 103a-f (block 414). If the exception is fatal (e.g., when the memory usage has surpassed the predetermined limit) (block 416), the script may be terminated (block 418) and the application 103a-f notified of the termination (block 420). The notification may be transmitted via the general transport protocol.

If the exception is not fatal (block 416) (e.g., there is a programming or syntax error in the script), a determination may be made whether the exception is caught (block 422). If the exception is not caught, the script may be terminated (block 418) and the application 103a-f notified (block 420).

If the exception is caught, the service or operation from the application 103a-f may be performed (block 424) unless another exception arises. In this case, the same process may be followed as illustrated in blocks 412-422.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A system comprising:
a vehicle-based processor, having access to stored security policies relating to vehicle resource usage, and configured to:
receive a resource access request from a remote application stored on a wirelessly connected device, including a list of all resources utilized by the application;
examine security requirements for each of the resources; and
set access rights for the application to use resources for which the security policy coincides with security rights of the application.

2. The system of claim 1, wherein the application has generalized security rights, and wherein a first coincidental security policy to the generalized rights permits access to a first level of vehicle resources.

3. The system of claim 2, wherein the first level of vehicle resources includes vehicle infotainment inputs and outputs.

4. The system of claim 1, wherein the application has specific security rights, and wherein a second coincidental security policy to the specific securityrights permits access to a second level of vehicle resources.

5. The system of claim 4, wherein the specific security rights are established by a security policy's specific reference to the application.

6. The system of claim 5, wherein the specific security rights vary from application to application, among applications having specific security rights, such that varied applications have access to different resources of the second level of vehicle resources.

7. The system of claim 1, wherein the processor is further configured to control resource usage, such that applications native to a vehicle computing system have priority in resource usage over remote applications.

8. The system of claim 7, wherein all native applications have priority over all remote applications.

9. The system of claim 7, wherein all native applications have priority over remote applications whose usage rights are provided under a generalized security policy.

10. A computer-implemented method comprising:
accessing stored security policies relating to vehicle resource usage;
receiving a resource access request from a remote application stored on a wirelessly connected device, including a list of all resources utilized by the application;
examining security requirements for each of the resources; and
setting, via a vehicle computer, access rights for the application to use resources for which the security policy coincides with security rights of the application.

11. The method of claim 10, wherein the application has generalized security rights, and wherein a coincidental security policy to the generalized rights permits access to a first level of vehicle resources.

12. The method of claim 11, wherein the first level of vehicle resources includes vehicle infotainment inputs and outputs.

13. The method of claim 10, wherein the application has specific security rights, and wherein a coincidental security policy to the specific security rights permits access to a second level of vehicle resources.

14. The method of claim 13, wherein the specific security rights are established by a security policy's specific reference to the application.

15. The method of claim 14, wherein the specific security rights vary from application to application, among applications having specific security rights, such that varied applications have access to different resources of the second level of vehicle resources.

16. The method of claim 10, further comprising controlling resource usage, such that applications native to a vehicle computing system have priority in resource usage over remote applications.

17. The method of claim 16, wherein all native applications have priority over all remote applications.

18. The method of claim 16, wherein all native applications have priority over remote applications whose usage rights are provided under a generalized security policy.

19. A non-transitory computer readable storage medium storing instructions that, when executed by a processor, cause the processor to perform the method including:
   accessing stored security policies relating to vehicle resource usage;
   receiving a resource access request from a remote application stored on a wirelessly connected device, including a list of all resources utilized by the application;
   examining security requirements for each of the resources; and
   setting, via a vehicle computer, access rights for the application to use resources for which the security policy coincides with security rights of the application.

* * * * *